(12) United States Patent
Wolff

(10) Patent No.: US 9,692,214 B2
(45) Date of Patent: Jun. 27, 2017

(54) DISPENSER FOR CABLE SUPPORT AND METHOD

(71) Applicant: Mark Richard Wolff, Kodak, TN (US)

(72) Inventor: Mark Richard Wolff, Kodak, TN (US)

( * ) Notice: Subject to any disclaimer, the term of this patent is extended or adjusted under 35 U.S.C. 154(b) by 77 days.

(21) Appl. No.: 14/685,306

(22) Filed: Apr. 13, 2015

(65) Prior Publication Data

US 2015/0282642 A1   Oct. 8, 2015

Related U.S. Application Data

(63) Continuation-in-part of application No. 14/245,715, filed on Apr. 4, 2014, now Pat. No. 9,322,493.

(60) Provisional application No. 61/981,877, filed on Apr. 21, 2014.

(51) Int. Cl.
| | |
|---|---|
| *H02G 1/06* | (2006.01) |
| *H02G 3/32* | (2006.01) |
| *A47F 1/12* | (2006.01) |
| *H02G 1/00* | (2006.01) |

(52) U.S. Cl.
CPC ............... *H02G 1/06* (2013.01); *A47F 1/12* (2013.01); *A47F 1/121* (2013.01); *H02G 1/00* (2013.01); *H02G 3/32* (2013.01); *Y10T 29/49959* (2015.01)

(58) Field of Classification Search
CPC ..... F16L 3/04; F16L 3/06; F16L 3/127; F16L 3/13; F16L 3/227; F16L 3/1218; B65D 85/54; B65D 2585/54; B65D 67/02; A47F 1/12; A47F 1/121; A47F 1/00; H02G 1/00; H02G 1/06; H02G 3/32

USPC .......... 248/71; 24/130, 131 R, 458; D8/356; D7/686; 221/312 A, 185; 294/11; 206/340

See application file for complete search history.

(56) References Cited

U.S. PATENT DOCUMENTS

| | | | |
|---|---|---|---|
| 83,913 A | 11/1868 | Bradley | |
| 279,113 A | 6/1883 | Clow | |
| 350,209 A | 10/1886 | Parmelee | |
| 354,235 A * | 12/1886 | Richards | B43M 99/009 206/338 |
| 472,948 A | 4/1892 | Gorton | |
| 1,054,707 A * | 3/1913 | Mertens | A47F 1/12 211/119.01 |
| 1,518,900 A | 12/1924 | Colbert | |
| 1,610,082 A | 12/1926 | Francis | |
| 1,736,707 A | 11/1929 | Lake | |
| 1,953,860 A | 4/1934 | Kraatz | |
| 2,043,716 A | 6/1936 | Stoan | |

(Continued)

FOREIGN PATENT DOCUMENTS

| | | |
|---|---|---|
| EP | 0567017 | 4/1993 |
| EP | 1850045 | 10/2007 |

(Continued)

*Primary Examiner* — Michael Safavi
(74) *Attorney, Agent, or Firm* — Pitts & Lake, P.C.

(57) ABSTRACT

A dispenser is disclosed for carrying and dispensing a cable support of the type having a pair of hook structures disposed on opposite sides of a central shaft. The dispenser comprises a plurality of rails extending in parallel, spaced-apart relationship to one another and joined to one another at respective proximal ends thereof. Each rail has a cantilevered distal end slidably receivable within one of the hook structures of the cable support. Each rail further has a cantilevered distal end to allow the cable support to be slidably removed from the rail along the distal end.

16 Claims, 7 Drawing Sheets

(56) References Cited

U.S. PATENT DOCUMENTS

| | | | |
|---|---|---|---|
| 2,188,084 A | 1/1940 | Kuckack | |
| 2,257,640 A | 9/1941 | Muller | |
| 2,307,348 A | 1/1943 | Anderson | |
| 3,180,489 A * | 4/1965 | McGinn | B65D 71/00 206/340 |
| 3,225,917 A * | 12/1965 | Couch | F16B 15/08 206/340 |
| 3,381,811 A * | 5/1968 | Saltz | B65D 71/00 206/338 |
| 3,618,446 A * | 11/1971 | Black | F16B 15/00 206/340 |
| 3,623,635 A * | 11/1971 | Erdmann | A61C 7/303 221/23 |
| 3,722,669 A * | 3/1973 | Meier | B65D 71/00 206/340 |
| 3,762,541 A * | 10/1973 | Hinden | B23K 11/0046 206/338 |
| 3,861,631 A | 1/1975 | Shorin | |
| 3,934,802 A | 1/1976 | Jennings | |
| 4,514,126 A * | 4/1985 | Knowles | E04C 3/292 206/338 |
| 4,633,605 A * | 1/1987 | Kang | G09F 3/12 206/343 |
| 4,655,423 A | 4/1987 | Schavilje et al. | |
| D298,600 S * | 11/1988 | Dallaire | D7/686 |
| 5,090,645 A | 2/1992 | Zuercher | |
| 5,207,404 A | 5/1993 | Reinhard | |
| 5,314,064 A * | 5/1994 | Wells | B25C 5/16 206/340 |
| 5,314,065 A * | 5/1994 | Ayres | F16B 15/0015 206/340 |
| D357,846 S * | 5/1995 | McNaughton | D7/686 |
| 5,927,497 A * | 7/1999 | Baumgartner | B65D 63/12 206/493 |
| 6,003,726 A * | 12/1999 | Hawkes | B25C 3/002 221/307 |
| D442,835 S * | 5/2001 | Kaposi | D7/686 |
| 6,918,222 B2 | 7/2005 | Lat et al. | |
| 6,969,039 B1 | 11/2005 | Diggle et al. | |
| 7,077,612 B1 | 7/2006 | Diggle et al. | |
| 7,093,714 B2 * | 8/2006 | Huang | B65D 71/50 206/303 |
| D533,035 S * | 12/2006 | Bodum | D7/686 |
| D539,638 S | 4/2007 | Franks | |
| 7,326,855 B2 | 2/2008 | Moffatt | |
| 7,410,137 B2 | 8/2008 | Diggle et al. | |
| D592,917 S * | 5/2009 | Jalet | D7/686 |
| 7,546,987 B2 | 6/2009 | Sinkoff | |
| D601,849 S * | 10/2009 | Zemel | D7/393 |
| 7,658,283 B2 * | 2/2010 | Pally | F16B 27/00 206/338 |
| 7,703,638 B2 * | 4/2010 | Magnani | B25C 3/00 221/165 |
| 8,505,772 B2 * | 8/2013 | Martin | A47F 1/10 206/155 |
| 2016/0001973 A1 * | 1/2016 | Castro | B65F 1/1415 220/571 |

FOREIGN PATENT DOCUMENTS

| | | | |
|---|---|---|---|
| GB | 1403714 | 8/1975 | |
| NL | 1001624 | 5/1997 | |
| WO | WO 2011/080553 | * 7/2011 | B65G 1/04 |
| WO | WO 2015/061835 | * 5/2015 | B65B 27/10 |

* cited by examiner

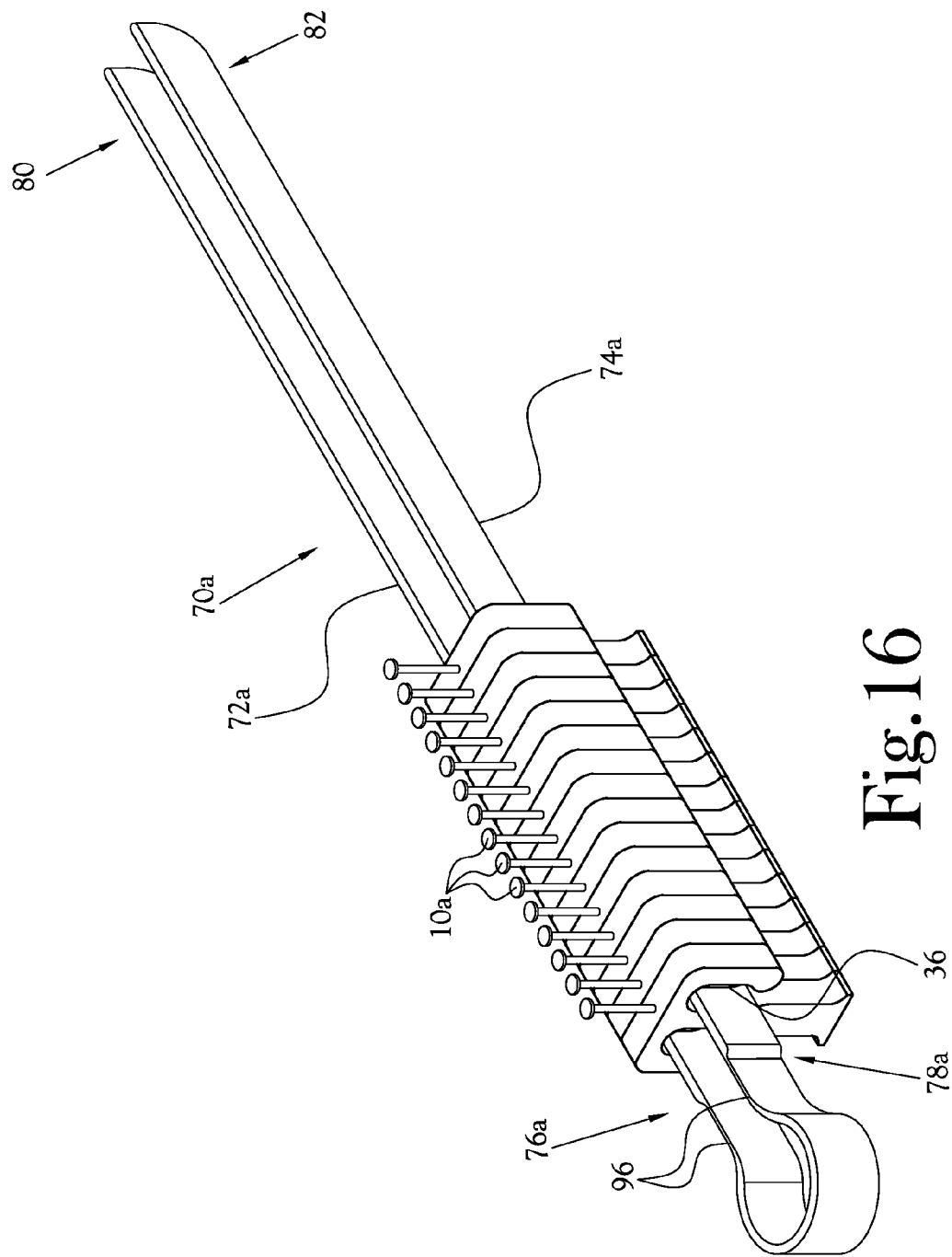

DISPENSER FOR CABLE SUPPORT AND METHOD

CROSS-REFERENCE TO RELATED APPLICATIONS

This application claims the benefit of U.S. Provisional Application No. 61/981,877, filed Apr. 21, 2014, and U.S. patent application Ser. No. 14/245,715, filed Apr. 4, 2014, each of which is incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The present general inventive concept relates to fasteners for securing wire, cable, or the like to a surface, and more particularly, to a fastener having inwardly-facing hook structures allowing convenient securement of one or more wires, cables, or the like to a structure, a dispenser for such fasteners, and a method of installing and using such fasteners.

2. Description of the Related Art

Various fasteners, such as for example staples, nails, clips, brackets, or the like, exist for use in securing one or more wires, cables, cords, or the like (hereinafter "cables") to a surface. Such fasteners are commonly used, for example, to assist in holding one or more cables against the framing members of a building to assist in routing the cables throughout the building. In common installation of a cable throughout a building comprising wood or metal studs, the cable is typically held against a surface of a stud while staples are driven into the surface in overlying relationship to the cable, thereby securing the cable along the surface. Typically, such staples are placed approximately every three to five feet along each cable to be secured.

The above-described process of mounting a cable along a surface by holding the cable against the surface and driving overlapping staples along the length of the cable presents several disadvantages. For example, the process of individually driving each prong of a two-pronged staple into the surface in a desired location, while simultaneously holding the cable in the desired location, is cumbersome. Furthermore, in the event one or more prongs of the staple contact the cable as they are driven into the surface, such prongs may damage the cable, such as for example by shearing or otherwise damaging the sheathing of the cable, by damaging or exposing the wiring of the cable beneath the sheathing, or by contacting the wiring of the cable and establishing electrical communication with the wiring of the cable. Such events may lead to risk of electrical failure of the cable, injury or damage due to electric shock from the wiring of the cable, and/or electrical fire in the building in which the cable is installed. In the event a hammer or other such tool is used to drive the staple, and in the event a user misses contacting the staple with the hammer, impact to the cable or surface may occur, thereby damaging the cable or surface. Moreover, when a cable is held in compression between a surface and a central portion of a staple, pressure exerted on the cable by the staple and the surface may further damage the cable. For example, in the event the cable is dragged along its length, such staples may shave off portions of the sheathing of the cable, thereby further exposing the inner wiring of the cable.

As an alternative to the above-discussed staples, various designs of plastic clips have been used to secure cables against surfaces, wherein a plurality of plastic clips are first fastened along the surface, and thereafter, a cable is positioned within a hook structure defined by the plastic clip. Typically, such hook structures open either outwardly from the surface or parallel along the surface, such that a cable can be more easily received within the hook structure. The use of such plastic clips is less likely to result in damage to the cable. However, when using such plastic clips, difficulty often arises in that the cable may be pulled from the outwardly-facing opening in the hook structure, thereby allowing the cable to become unfastened from the plastic clip if the cable is pulled. Furthermore, such plastic clips are often designed to secure a single cable, and cannot accommodate fastening of multiple cables using a single plastic clip. Moreover, such plastic clips are often, themselves, difficult and cumbersome to install along the surface to which the cable is to be mounted.

In either of the above-discussed alternatives, additional disadvantages are presented in that it is often cumbersome to carry multiple loose staples, hooks, or the like for installation along a desired surface. Furthermore, it is often time consuming to individually select, separate, and place each such staple or hook at a desired location along the surface before fastening the staple or hook in place. Accordingly, there is a need for a cable support which allows fastening of multiple cables to a surface, which is quick and convenient to install, and which minimizes the risk of damage to the cable and/or the risk of the cable becoming unfastened from the cable support. There is further a need for a dispenser for such a cable support that may allow quick and convenient installation of a cable support fastener to a desired surface.

BRIEF SUMMARY OF THE INVENTION

The present general inventive concept provides a dispenser for carrying and dispensing a cable support of the type having a pair of hook structures disposed on opposite sides of a central shaft. According to various example embodiments of the present general inventive concept, a plurality of rails may be provided extending in parallel, spaced-apart relationship to one another and joined to one another at respective proximal ends thereof. Each rail may have a cantilevered distal end slidably receivable within one of the hook structures of the cable support. Each rail may further have a cantilevered distal end to allow the cable support to be slidably removed from the rail along the distal end.

Example embodiments of the present general inventive concept may be achieved by providing each of the rails integrally formed with one another. Additional example embodiments may be achieved wherein each rail has a cross-sectional shape keyed to an interior surface of a hook structure of a cable support. In some embodiments, each rail may be resiliently deformable to allow receipt of the rail within a hook structure of a cable support. In some embodiments, each rail may comprise first and second elongated, adjacent flanges extending along a length of the rail, each flange having a first long edge joined to a first long edge of the adjacent flange and an opposite second long edge separated from the second long edge of the adjacent flange. In some embodiments, each rail distal end may define a taper toward the first long edges of the flanges. In some embodiments, each rail may define a flattened planar portion extending along a portion of the length of the rail in parallel-planar, overlying, and spaced-apart relationship with the flattened planar portion of the other rail, whereby each cable support is removable from the rails in a direction perpendicular to the length of the rails along the flattened planar portions.

The present general inventive concept further provides a method for securing a cable along a surface. Example embodiments of the present general inventive concept may be achieved in which a dispenser is provided having a plurality of rails extending in parallel, spaced-apart relationship to one another, each rail having a proximal end and a cantilevered distal end. In some embodiments, a plurality of cable supports are provided, carried by the rails of the dispenser. Each cable support may have a central shaft portion with a forward end configured to be secured to the surface, a rearward end configured to extend from the surface, and for each rail, a hook structure extending from the central shaft portion rearward end and curving toward the central shaft portion forward end. Each hook structure may have a corresponding rail slidably received therein such that the plurality of cable supports are arranged in a substantially stacked configuration along the rails. Some embodiments, of the present general inventive concept may be achieved by sliding a distal most one of the cable supports toward the distal ends of the rails, thereby separating the distal most cable support from the remaining cable supports. The dispenser may be positioned proximate the surface with the forward end of the distal most cable support proximate a desired mounting location along the surface. The forward end of the distal most cable support may be fastened to the surface proximate the desired mounting location, thereby mounting the cable support to the surface. The distal ends of the rails may be slidably removed from the mounted cable support. The cable may be inserted into a hook structure of the mounted cable support, thereby securing the cable along the surface. In some embodiments, the operation of fastening the forward end of the distal most cable support to the surface may include driving a pin fastener extending along the central shaft portion of the cable support into the surface.

Additional features of the present general inventive concept will be set forth in part in the description which follows, and, in part, will be obvious from the description, or may be learned by practice of the present general inventive concept.

BRIEF DESCRIPTION OF THE SEVERAL VIEWS OF THE DRAWINGS

The above-mentioned features of the invention will become more clearly understood from the following detailed description of the invention read together with the drawings in which:

FIG. 16 is a perspective view showing another embodiment of a dispenser for a cable support constructed in accordance with several features of the present general inventive concept.

DETAILED DESCRIPTION OF THE INVENTION

Figure 1:
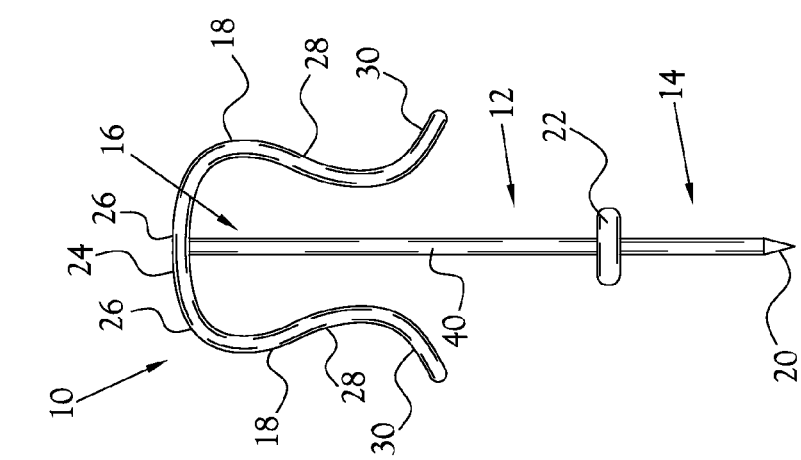
FIG. 1 is a plan view of one embodiment of a cable support constructed in accordance with several features of the present general inventive concept.
Figure 4:
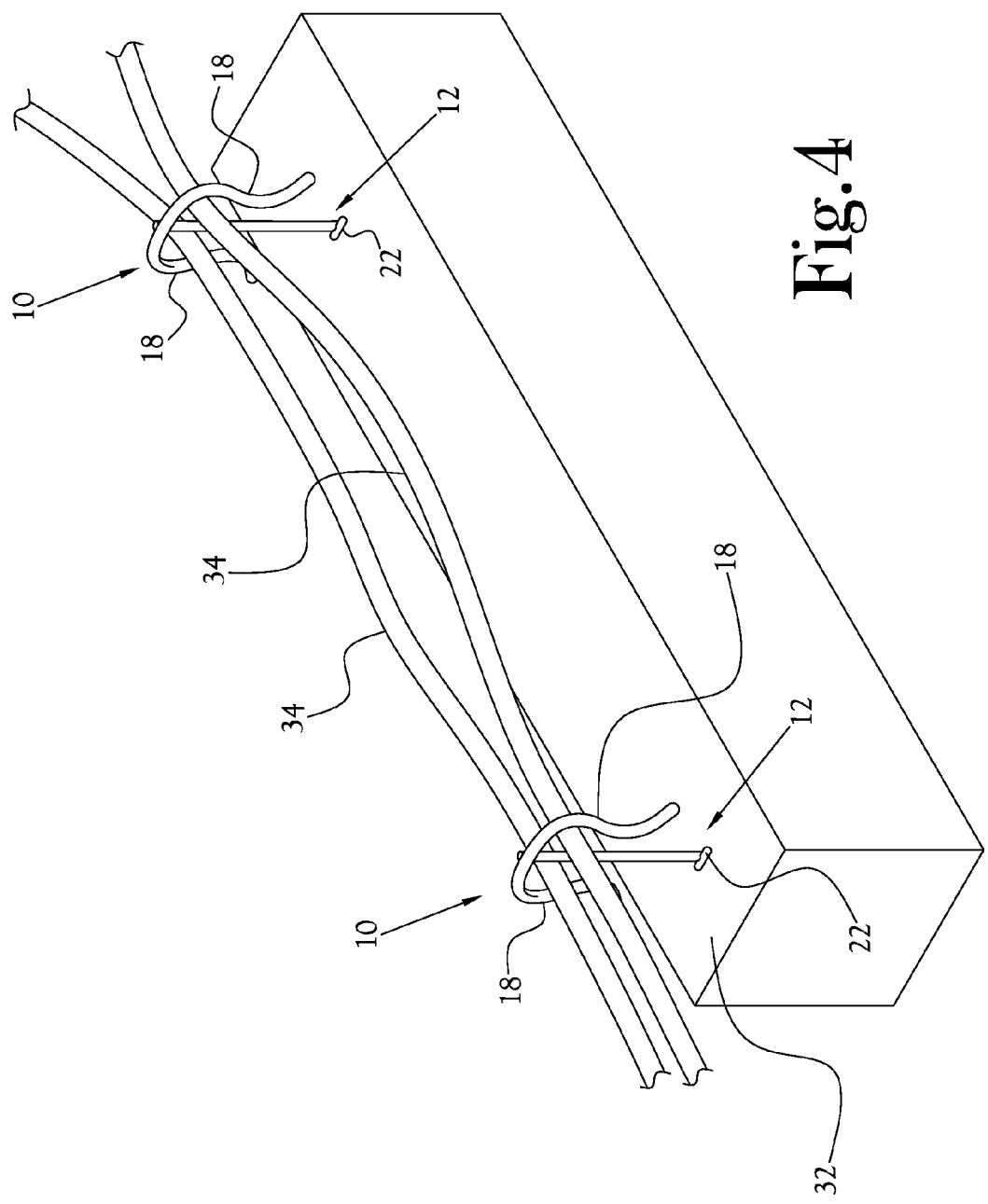
FIG. 4 is a perspective view of a support structure having multiple cable supports secured thereto, the cable supports having cables received therein.

Various embodiments of a cable support constructed in accordance with several features of the present general inventive concept are described herein and illustrated in the accompanying figures. With reference to FIG. 1, one embodiment of a cable support, constructed in accordance with several features of the present general inventive concept, is identified at 10. The cable support 10 includes generally a substantially straight, elongate central shaft portion 12 having a forward end 14, which is configured to be secured to a surface, and a rearward end 16. As will further be discussed below, a plurality of inwardly-facing hook portions 18 are secured to the rearward end 16. Each hook portion 18 is configured to receive and engage one or more portions of one or more cables therein, such that the cables are secured adjacent the central shaft portion 12. According to certain features of the present general inventive concept, in certain embodiments, the hook portions 18 terminate sufficiently rearward of the forward end 14 to allow the cables to be received within the hook portions 18 after the forward end 14 is secured to a surface. In certain embodiments, the hook portions 18 are further configured to allow removal of the cables from within the hook portions 18 absent disengagement of the forward end 14 from the surface.

In several embodiments, the forward end 14 of the central shaft portion 12 of the cable support 10 defines suitable features to assist in allowing the forward end 14 to be secured to a surface. For example, in the embodiment of FIG. 1, the forward end 14 defines a tapered point 20. In the illustrated embodiment, the remainder of the forward end 14 defines a substantially smooth elongate shaft, such that the forward end 14 resembles the driving end of a nail, spike, or other such pin fastener. In other embodiments, the forward end 14 defines a plurality of annular ridges or rings extending in side-by-side relationship to one another along a length of the forward end 14, such that the forward end 14 resembles the driving end of a ringed nail. In other embodiments, the forward end 14 portion of the central shaft portion 12 defines an outwardly threaded surface, such that the forward end 14 may resemble a screw, bolt, or other such threaded fastener. In still other embodiments, the forward end 14 portion of the central shaft portion 12 defines a plurality of outwardly and rearwardly projecting barbs 50 (see FIG. 7) which assist in limiting retraction of the forward end 14 from within a surface once the forward end 14 is driven into the surface. Those skilled in the art will recognize other features which may assist in allowing the forward end 14 of the central shaft portion 12 to be secured to a surface, and such features may be used without departing from the spirit and scope of the present general inventive concept.

In the embodiment of FIG. 1, a stop 22 is disposed along the central shaft portion 12 rearward of the forward end portion 14. The stop 22 is of sufficient size and shape to impede, and preferably to altogether arrest, forward motion of the forward end portion 14 of the central shaft portion 12 into a surface upon contact of the stop 22 with the surface. In the illustrated embodiment, the stop 22 consists of a relatively short, but elongated, member which is secured to the central shaft portion 12 substantially perpendicular to the central shaft portion 12 rearward of the forward end portion 14. In other embodiments, the stop 22 consists of an annular disc which is fixed to, or integrally formed with, the central shaft portion 12 rearward of the forward end portion. In still other embodiments, the stop 22 may define one or more forwardly-projecting barbs (not shown) which assist in establishing a frictional connection between the surface and the stop 22, thereby assisting in limiting continued forward driving of the forward end portion 14 of the central shaft portion 12 into the surface.

The central shaft portion 12 is of a substantially rigid construction such that the forward end 14 may be driven into a surface, such as for example a wooden surface defined by a structural member. To this end, in various embodiments, the rearward end 16 of the central shaft portion 12 defines a head portion 24 which is shaped and oriented along the central shaft portion 12 to allow the head portion 24 to receive force from a drive tool and to transfer such force to the central shaft portion 12. For example, in the illustrated embodiment, the head portion 24 defines a substantially flat end surface of the central shaft portion 12 which extends generally normal to a length dimension of the central shaft portion 12, such that the head portion 24 may receive impact from a hammer or other impact drive device to drive the central shaft portion 12 forward. In another embodiment, the head portion 24 may define one or more slots along and end surface of the central shaft portion 12, such slot or slots being configured to receive a screwdriver head or other such rotary drive tool to allow rotary driving of the central shaft portion 12. Those skilled in the art will recognize numerous other shapes and configurations which may be embodied by the head portion 24 to allow for forward driving of the central shaft portion 12, and such shapes and configurations may be used without departing from the spirit and scope of the present general inventive concept.

Referring to FIG. 1, according to several features of the present general inventive concept, the cable support 10 includes at least one, and preferably two, hook portions 18 which extend on opposite sides of the central shaft portion 12. Each hook portion 18 defines a rearward hook portion 26 which projects outwardly from the length dimension of the central shaft portion 12, a central hook portion 28 which curves both inwardly toward the central shaft portion 12 and forward toward the forward end 14, and a forward hook portion 30 which curves both forward toward the forward end 14 and outwardly from the central shaft portion 12. Thus, each hook portion 28 defines a "recurve" shape which opens forwardly toward the forward end 14 of the central shaft portion 12. In several embodiments, the rearward hook portion 26 projects substantially perpendicular to, or at a slight forward angle to, the length dimension of the central shaft portion 12, such that the head portion 24 of the central shaft portion 12 defines a rearmost feature of the cable support 10. In several embodiments, each forward hook portion 30 terminates at a distance outward from the central shaft portion 12 substantially equal to the distance of furthest extent of the rearward and central hook portions 26, 28 from the central shaft portion 12. Furthermore, in several embodiments, each forward hook portion 30 terminates at a distance sufficiently rearward of the forward end portion 14 and stop 22 so as to allow receipt of at least one cable between the forward hook portion 30 and the surface when the forward end 14 is driven into the surface.

Figure 3:
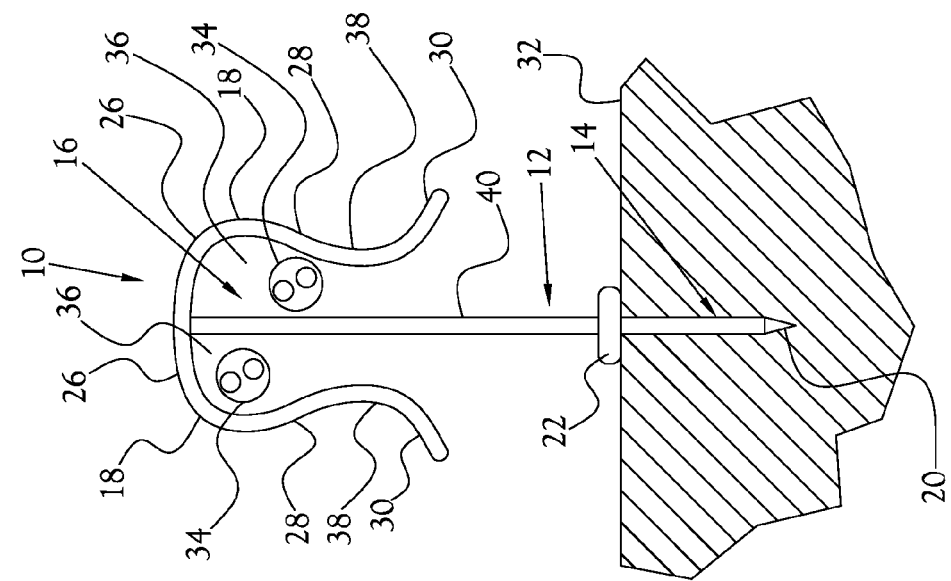
FIG. 3 is a cross-sectional view of a support structure having a cable support secured thereto, the cable support having cables received therein.
Figure 2:
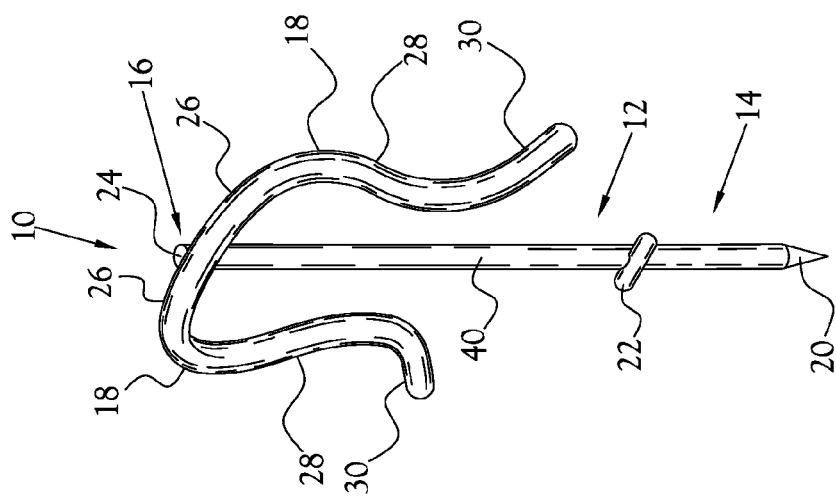
FIG. 2 is a perspective view of the cable support of FIG. 1.

As shown in FIG. 3, in use, the forward end 14 of the cable support 10 may be driven into a surface 32, such as a wooden, plaster, or other such surface of a structure. Thereafter, portions of one or more cables 34 may be received between the surface 32 and the forward hook portion 30 of one of the hook structures 18, pushed rearward between the forward hook portion 30 and the central shaft portion 12, and received within the void 36 defined between the rearward and central hook portions 26, 28 and the central shaft portion 12. To this end, the inwardly curved portion 38 of the hook portion 18 at the interface between the central and forward hook portions 28, 30 serves to at least partially restrict access to and from the void 36 defined between the rearward and central hook portions 26, 28 and the central shaft portion 12, thereby assisting in retaining the cable 34 within the void 36. In the present embodiment, the central shaft portion 12 and the two hook portions 18 of the cable support 10 are integrally formed with one another, and as noted above, are constructed of a substantially rigid material, such as for example iron, steel, aluminum, or the like. In this embodiment, the inwardly curved portion 38 of the hook portion 18 is separated from the central shaft portion 12 a sufficient distance to allow the cable 34 to slide snugly between the inwardly curved portion 38 and the central shaft portion 12, so as to establish a frictional connection, similar to a snap fit, of the cable 34 within the void 36. Once received therein, the cable 34 is frictionally retained within the void 36 sufficiently that the cable 34 will not fall of its own accord from within the void 36. However, the cable 34 may nonetheless be removed from within the void 36 by pushing the cable from within the void 36 along the central shaft portion 12 toward the forward end 14. In another embodiment, the hook portions 18 of the cable support 10 are capable of slight flexure sufficient to allow a cable 34 having a cross-sectional diameter which is wider than the distance between the inwardly curved portion 38 and the central shaft portion 12 to be slid between the inwardly curved portion 38 and the central shaft portion 12 and into the void 36.

In several embodiments, exterior surfaces of the cable support 10 rearward of the stop 22 may be fabricated from a material which renders them substantially non-conductive to electricity. For example, in the illustrated embodiment, the cable support 10, including the central shaft portion 12 and two hook portions 18 which are integrally formed with one another, is fabricated primarily from stainless steel. In this embodiment, a coating 40 is provided over exterior surfaces of the hook portions 18 and the central shaft portion 12 rearward of the stop 22. The coating is fabricated from a substantially non-conductive material, such as for example polymer, rubber, or the like. In other embodiments, a coating 40 may be provided over all exterior surfaces of the cable support 10. Those skilled in the art will recognize other configurations for the coating 40 which may be used without departing from the spirit and scope of the present inventive concept. Furthermore, it will be recognized by one of skill in the art that inclusion of the coating 40 is not critical to accomplishing the present general inventive concept.

Figure 5:
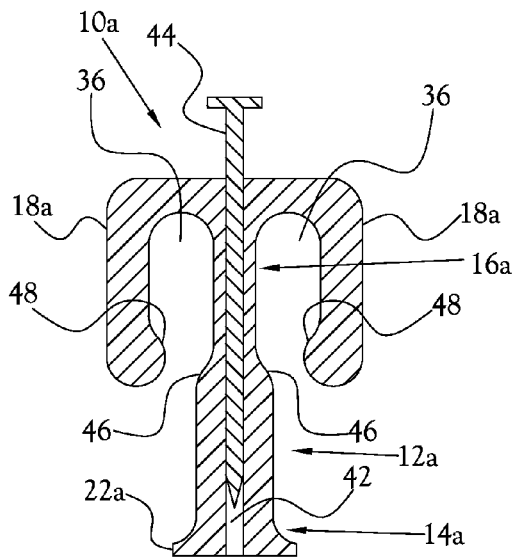
FIG. 5 is a cross-sectional view of another embodiment of a cable support constructed in accordance with several features of the present general inventive concept.
Figure 6:
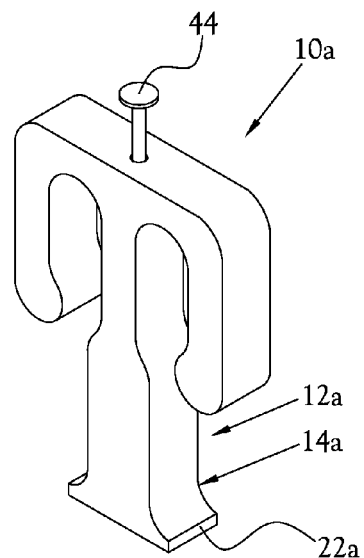
FIG. 6 is a perspective view of the cable support of FIG. 5.

FIGS. 5 and 6 illustrate another embodiment of a cable support 10a constructed in accordance with several features of the present general inventive concept. In the embodiment of FIGS. 5 and 6, the cable support 10a is defined by a bracket which is fabricated from a substantially rigid material, such as for example polymer, resin, or the like, and which is adapted to receive a pin, screw, or other such fastener 44 therein to secure the bracket to a surface 32. More specifically, in the illustrated embodiment, the cable support 10a includes a central shaft portion 12a which defines a central elongate through opening 42 extending along the length dimension of the central shaft portion 12a and opening to the forward and rearward ends 14a, 16a of the cable support 10a. The through opening 42 is sized and shaped to receive snugly therein an elongated fastener 44, such as for example a nail, pin, screw, bolt, or similar fastener having sufficient length that the fastener 44 may extend from the rearward end 16a of the central shaft portion 12a, through the central shaft portion 12a and protrude forwardly of the forward end 14a. Thus, in this embodiment, the forward end 14a of the cable support 10a is configured to abut the surface 32, while a forward portion of the fastener 44 may extend forward of the forward end 14a to secure the cable support 10a to the surface 32. In the illustrated embodiment, the forward end 14a defines a stop 22a which consists essentially of a widened portion of the central shaft portion 12a that defines a flat end surface at the forward end 14a of the central shaft portion 12a. The stop 22a assists in abutting the cable support 10a in a substantially perpendicular orientation against the surface 32 prior to driving the fastener 44 through the opening 42 and into the surface 32.

In the embodiment of FIGS. 5 and 6, the rearward end 16a of the central shaft portion 12a is tapered slightly as compared to the forward end 14a, such that a shoulder 46 is formed on each opposite side of the central shaft portion 12a at an interface between the forward and rearward ends 14a, 16a. In this embodiment, each interior surface of each hook portion 18a defines an inward protrusion 48 extending toward, but separated slightly from, a cooperating shoulder 46. Thus, for each hook portion 18a, the inward protrusion 48 and corresponding shoulder 46 cooperate to at least partially restrict access to and from the void 36 defined rearward of the protrusion 48 and shoulder 46, between the hook portion 18a and the central shaft portion 12a. In several embodiments, fabrication of the cable support 10a from a polymer, resin, or like material allows the hook portions 18a of the cable support 10a to exhibit greater flexibility than the fastener 44, and thus, allow greater ease of receipt of one or more cables 34 within the hook portions 18a of the cable support 10a.

Figure 7:
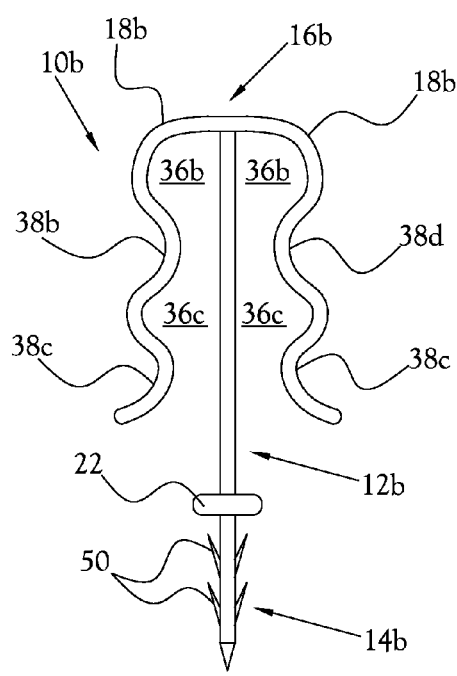
FIG. 7 is a plan view of another embodiment of a cable support constructed in accordance with several features of the present general inventive concept.
Figure 8:
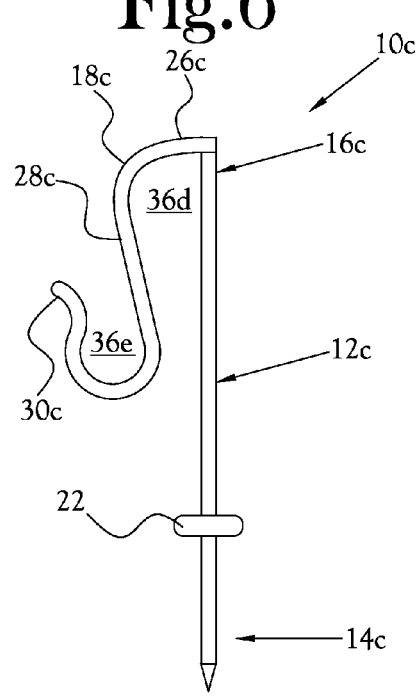
FIG. 8 is a plan view of another embodiment of a cable support constructed in accordance with several features of the present general inventive concept.

FIGS. 7 and 8 illustrate two additional embodiments of the cable support 10b, 10c, each constructed in accordance with additional features of the present general inventive concept. In the embodiment of FIG. 7, additional recurve shapes are defined by each hook portion 18b, such that a plurality of alternating inwardly curved portions 38b, 38c and voids 36b, 36c, are defined by each hook portion 18b along the central shaft portion 12b. In this embodiment, a cable 34 may be received within the first void 36c defined between a hook portion 18b and the central shaft portion 12b slightly rearward of the first inwardly curved portion 38c of the hook portion 18b by placing the cable 34 forward of the hook portion 18b and sliding the cable 34 between the first inwardly curved portion 38c and the central shaft portion 12b as discussed above. Thereafter, the cable 34 may be received within the second void 36b defined between the hook portion 18b and the central shaft portion 12b slightly rearward of the second inwardly curved portion 38b by further sliding the cable between the second inwardly curved portion 38b and the central shaft portion 12b, thus allowing additional cables 34 to be received within the first void 36c. In this manner, multiple cables may be held by each hook portion 18b, while simultaneously keeping each cable slightly separated from one another.

In the embodiment of FIG. 8, each hook portion 18c defines a rearward hook portion 26c which projects axially outwardly from the length dimension of the central shaft portion 12c, a central hook portion 28c which curves both inwardly toward the central shaft portion 12c and forward toward the forward end 14c, and a forward hook portion 30c which curves outwardly from the central shaft portion 12c and rearward toward the rearward end 16c of the central shaft portion. Thus, in the embodiment of FIG. 8, a pair of voids 36d, 36e are defined by each hook portion 18c, a first void 36d being defined along an inner surface of each hook portion 18c between the hook portion 18c and the central shaft portion 12c, and a second void 36e being defined along an outer surface of each forward hook portion 30c.

Figure 9:
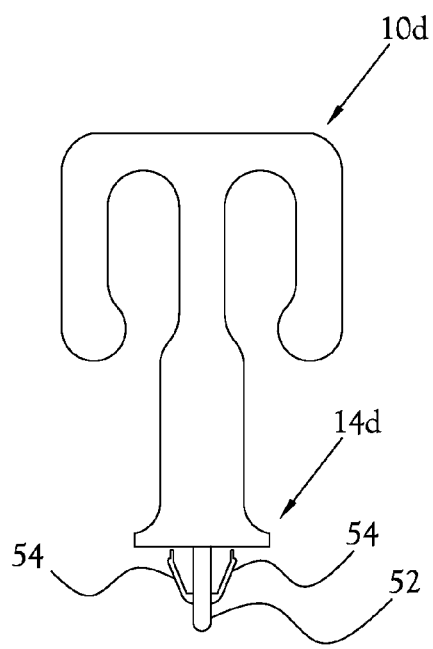
FIG. 9 is a plan view of another embodiment of a cable support constructed in accordance with several features of the present general inventive concept.

It will be recognized that numerous types of fasteners exist which are suitable for securing the forward end 14 of the cable support 10 to a surface 32. To this end, FIGS. 9-12 illustrate several additional embodiments of the cable support 10d-10g, each of which defines a different fastener for securing the forward end of the support to a surface. In the embodiment of FIG. 9, the cable support 10d defines a pin 52 fixed to, and extending forwardly of, the forward end 14d. A pair of resiliently flexible tabs 54 extend from a forward end of the pin 52 outwardly from the pin 52 and rearward toward the forward end 14d, terminating slightly forward of the forward end 14d. Thus, the pin 52 and associated tabs 54 may be inserted into an opening in a thin layer of material, such as for example sheet metal or the like, in which the opening is sized slightly smaller in diameter than the span of the tabs 54, upon which the tabs 54 may flex inwardly toward the pin 52 to allow the fastener to be received through the opening. Thereafter, the tabs 54 may return to their original outward configuration, thereby locking the fastener into the opening and securing the forward end 14d against the thin layer of material.

Figure 10:
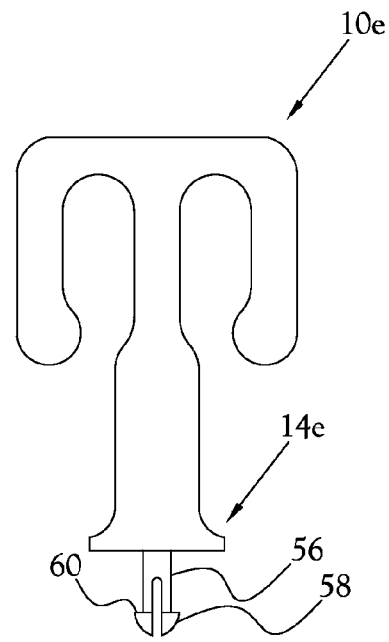
FIG. 10 is a plan view of another embodiment of a cable support constructed in accordance with several features of the present general inventive concept.

In the embodiment of FIG. 10, the cable support 10e defines a pin 56 which is fixed to, and extends forwardly from, the forward end 14e. The pin 56 is partially bifurcated along a length thereof and defines an outwardly flared forward end 58 defining a rearward lip 60. Thus, upon insertion of the forward end 58 into an opening in a thin layer of material in which the opening is sized slightly smaller in diameter than the span of the lip 60, the bifurcated portion of the pin 56 may flex inwardly to allow the forward end 58 to be received through the opening. Thereafter, the bifurcated portion of the pin 56 may return to its original configuration, thereby locking the forward end 58 of the fastener into the opening and securing the forward end 14e of the cable support 10e to the material.

Figure 11:
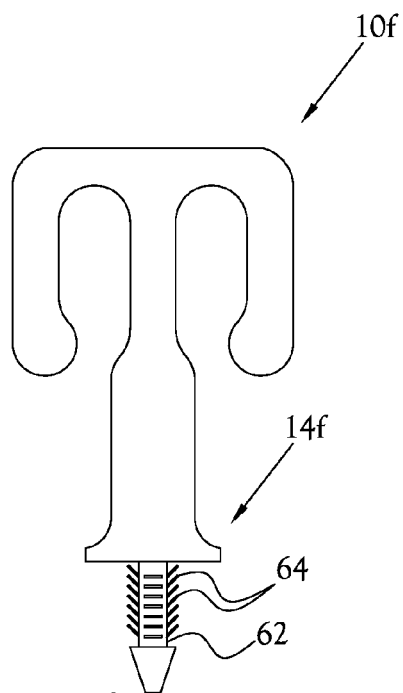
FIG. 11 is a plan view of another embodiment of a cable support constructed in accordance with several features of the present general inventive concept.
Figure 12:
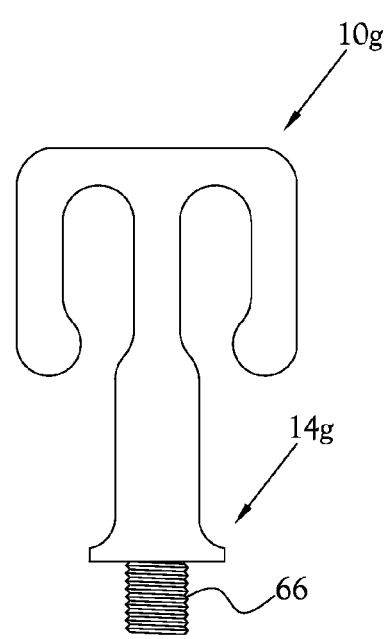
FIG. 12 is a plan view of another embodiment of a cable support constructed in accordance with several features of the present general inventive concept.

FIG. 11 illustrates a cable support 10f which defines a pin 62 projecting forwardly of the forward end 14f of the cable support 10f. In the embodiment of FIG. 11, the pin 62 defines a plurality of outwardly and rearwardly projecting tabs 64 disposed along the length of the pin 62. Similarly to the embodiment of FIG. 9, the tabs 64 may flex rearwardly and inwardly toward the pin 62 to allow the pin 62 to be inserted into an appropriately sized opening, and thereafter may provide resistance to removal of the pin 62 from within the opening. In the embodiment of FIG. 12, an outwardly-threaded bolt 66 projects from a forward end 14g of the cable support 10g. Thus, the bolt 66 may be secured to an inwardly-threaded opening of similar size to the bolt 66, thereby allowing the bolt 66 to secure the cable support 10g to a surface. Those of skill in the art will recognize other fastener devices which may also be used without departing from the spirit and scope of the present general inventive concept.

In each of the above-discussed embodiments, the central shaft portion 12 and hook portions 18 of the cable support 10 are each disposed in a relatively flat, planar relationship with one another. Thus, in various methods of use of the cable support 10, a plurality of cable supports 10 may be provided in a stacked, overlying relationship with one another, such that the stack of cable supports 10 may be received and fed along a dispensing device. For example, in various embodiments, a plurality of cable supports 10 may be arranged in a stacked configuration such that the cable supports may be received within and fed through a feeding device of an automatic driving tool, such as for example a pneumatic nail gun or other similar device, in order to assist a user in rapid mounting of several cable supports 10 along a desired surface 32. Alternatively, each cable support 10 may be provided separately from other cable supports 10, such that a user may drive each cable support 10 into a desired surface 32 individually and through more conventional means as discussed above.

Figure 13:
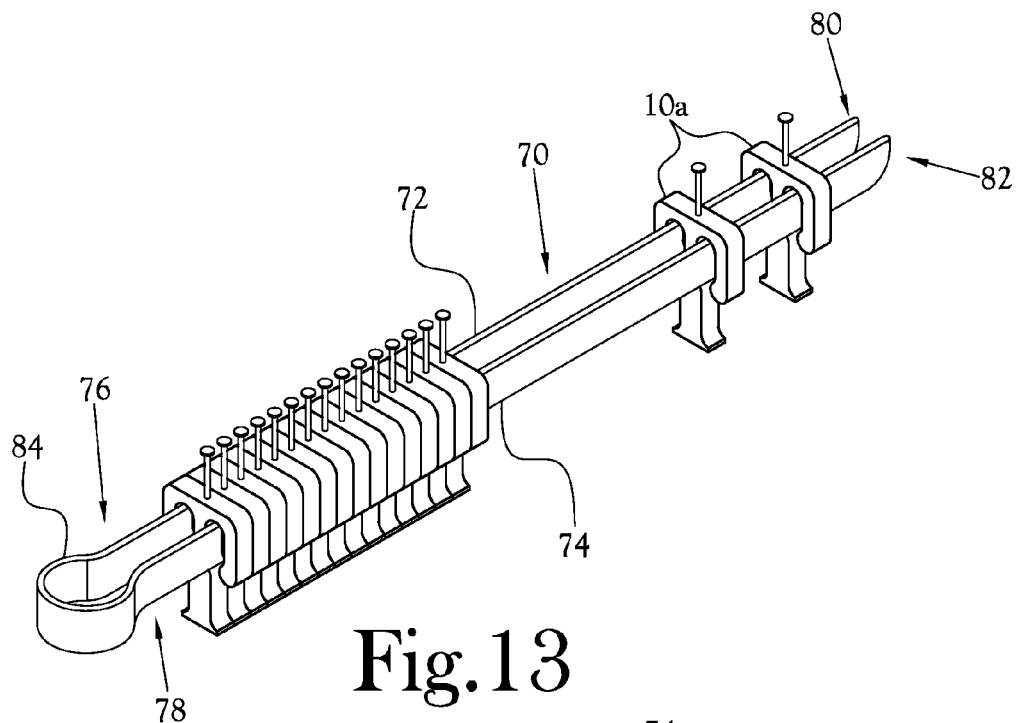
FIG. 13 is a perspective view of one embodiment of a dispenser for a cable support constructed in accordance with several features of the present general inventive concept.

In accordance with several features of the present general inventive concept, a dispenser 70 is provided which is capable of allowing quick and convenient installation of one or more cable supports 10 to a desired surface. One embodiment of a dispenser 70 is illustrated in FIG. 13. With reference to FIG. 13, in the illustrated embodiment, the dispenser 70 includes generally a plurality of spaced apart rails 72, 74, which are configured to extend in a generally parallel-planar relationship with one another, and which are sized and shaped to allow each rail 72, 74 to be slidably received within a corresponding one of the voids 36 of a cable support 10. In this manner, a plurality of cable supports 10 may be received and carried along the length of the rails 72, 74 such that the dispenser 70 serves to maintain the cable supports in a stacked, overlying relationship with one another. As will be further discussed hereinbelow, in various embodiments, the dispenser 70 defines one or more additional features which allow the received cable supports 10 to be removed from along the rails 72, 74. In several embodiments, the dispenser 70 may be used to position one or more of the cable supports 10 carried along the rails 72, 74 at a desired mounting location along a surface 32, whereupon the positioned cable support 10 may be fastened to the surface 32 at the desired location and then removed from the dispenser 70.

In the embodiment of FIG. 13, a dispenser 70 is provided which is suitable for use with the above-discussed cable support 10a of FIGS. 5 and 6. In the illustrated embodiment, the dispenser 70 defines a pair of elongated rails 72, 74 which are arranged in a substantially parallel, side-by-side relationship with one another. The rails 72, 74 each define respective adjacent proximal ends 76, 78 and distal ends 80, 82. The proximal ends 76, 78 of the rails 72, 74 are joined to one another via a loop portion 84 which, in the present embodiment, is integrally formed with each of the rails 72, 74 at their respective proximal ends 76, 78. Thus, in the present embodiment, the rails 72, 74 and the loop portion 84 cooperate to define a unitary member.

As discussed above, each of the rails 72, 74 is of a suitable size and shape to allow one rail to be slidably received within a corresponding one of the voids 36 of a cable support 10a. More specifically, in various embodiments, each of the rails 72, 74 is sized and shaped to allow each rail to fit snugly within a corresponding void 36 of a cable support 10a, such that the cable support 10a may be slid along the rails 72, 74 to a desired location along the length of the dispenser 70. In several embodiments, the rails 72, 74 are configured to frictionally engage the cable support 10a to a degree sufficient to generally maintain the cable support 10a at the desired location along the dispenser 70 and to limit, and preferably to prevent, unintentional sliding movement of the cable support 10a along the rails 72, 74. For example, in the present embodiment, and with reference to FIG. 14, each rail 72, 74 comprises first and second substantially flat, elongated flanges 86, 88 extending adjacent to one another to form a V-shaped angle therebetween. Each flange 86, 88 has a first long edge 90 which is joined to the first long edge of the adjacent flange, as by the illustrated integral connection, adhesive, or the like, and an opposite second long edge 92 separated slightly from the second long edge of the adjacent flange. Thus, each rail 72, 74 defines a generally V-shaped channel extending along a length thereof.

In various embodiments, each of the flanges 86, 88 forming the rails 72, 74 is fabricated from a relatively stiff, yet slightly resiliently flexible material, such as for example polymer plastic, vinyl, metal, or the like. In the illustrated embodiment, each of the flanges defines a width dimension between its opposite first and second long edges 90, 92 slightly less than a height dimension of one of the voids 36 of the cable support 10a, such that, when one of the rails 72, 74 is received within the void 36, each of the flanges 86, 88 forming the rail extends generally from an upper end of the void 36, located along an inner surface of the hook portion 18a near the intersection of the hook portion 18a with the central shaft portion 12a, to either the inward protrusion 48 or shoulder 46 at the lower end of the void 36. Furthermore, in the illustrated embodiment, for each rail 72, 74, the distance of separation of the second long edges 92 of the flanges 86, 88 is slightly greater than the width of the portion of the void 36 adjacent the second long edges 92. Thus, in the illustrated embodiment, when each rail 72, 74 is received within a respective one of the voids 36 of a cable support 10a, the second long edges 92 of the flanges 86, 88 are made to flex slightly toward one another, thereby biasing the second long edges 92 toward the interior surfaces of the corresponding void 36. This bias of the second long edges 92 toward the interior surfaces of their corresponding void 36 promotes the above-discussed frictional engagement of the interior surfaces of the void 36 by the corresponding flanges 86, 88, thereby assisting in retaining the cable support 10a along the rails 72, 74. In several embodiments, external surfaces of the rails 72, 74 may define one or more textures which are selected to improve frictional engagement between the rails 72, 74 and the interior surfaces of the voids 36 of the cable support 10a. However, it will be recognized that inclusion of such textures are not essential to the present general inventive concept. Accordingly, in other embodiments, external surfaces of the rails 72, 74 may define smooth surfaces.

Figure 14:
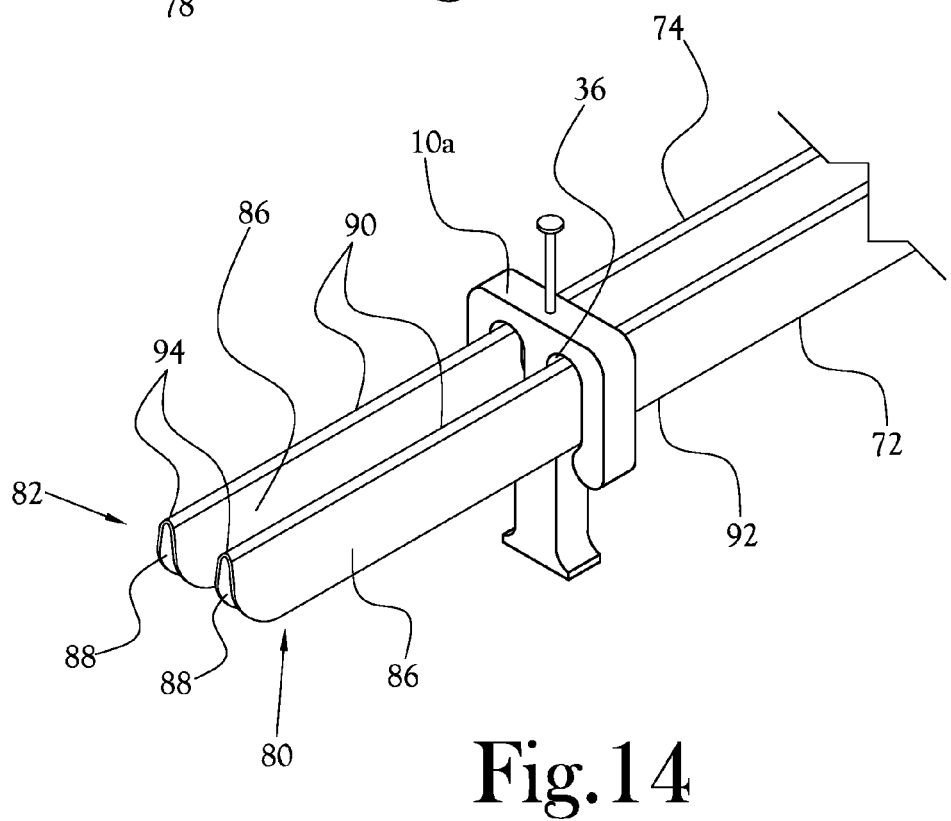
FIG. 14 is a partial perspective view of the dispenser of FIG. 13.

As shown in FIGS. 13 and 14, the distal ends 80, 82 of the rails extend generally cantilevered outwardly along the dispenser 70, opposite the loop portion 84. Thus, each cable support 10a received along the rails 72, 74 may be removed from the dispenser 70 by sliding the cable support 10a along the rails 72, 74 toward and beyond the distal ends 80, 82. Likewise, additional cable supports 10a may be received along the rails 72, 74 by threading each of the distal ends 80, 82 of the rails 72, 74 through a respective one of the voids 36 of the cable support 10a and sliding the cable support 10a along the rails 72, 74 toward the loop portion 84. In the illustrated embodiment, the above-discussed flexibility of the rails 72, 74 allows for additional cable supports 10a to be received along the rails 72, 74 by inserting each of the rails into a respective one of the voids 36 through the space between the inward protrusion 48 and shoulder 46 at the lower end of each void 36. Likewise, cable supports 10a may be removed from the dispenser 70 by pushing each rail 72, 74 outward from its respective void 36 of the cable support 10a through the space between the inward protrusion 48 and shoulder 46 at the lower end of each void 36. However, it will be recognized that, in other embodiments, the rails 72, 74 may be fabricated from a more rigid material and/or define a shape which is less conducive to the above-discussed operation of insertion and removal of the cable support 10a through the space between the inward protrusion 48 and shoulder 46 at the lower end of each void 36, such that, in those embodiments, the dispenser 70 is limited to addition and removal of cable supports 10a via the distal ends 80, 82 of the rails 72, 74. For example, in one embodiment, each of the rails defines a rigid and relatively inflexible member having a cross-sectional shape which is keyed to a respective one of the voids 36 of the cable support 10a. Thus, in such embodiment, removal and receipt of cable supports 10a from and onto the rails is limited to the above-described sliding movement of the cable supports 10a onto and off of the distal ends of the rails.

In several embodiments, the distal ends 80, 82 of the rails 72, 74 each define a tapered shape to assist in threading the rail distal ends 80, 92 through a respective one of the voids 36 of the cable support 10a. More specifically, in the illustrated embodiment, each of the first long edges 90 of the flanges 86, 88 forming the rails 72, 74 terminates slightly distally beyond their corresponding second long edges 92, such that the distal ends 80, 82 of each of the rails 72, 74 taper upwardly toward the distal terminations 94 of the first long edges 90. Thus, in the illustrated embodiment, the above-described operation of threading each of the distal ends 80, 82 of the rails 72, 74 through a respective one of the voids 36 of the cable support 10a may be accomplished by first threading each of the distal terminations 94 of the first long edges 90 of the flanges 86, 88 through a respective one of the voids 36 of the cable support 10a, and thereafter threading the remainder of the distal ends 80, 82 of the rails 72, 74 through the respective voids 36.

Figure 15:
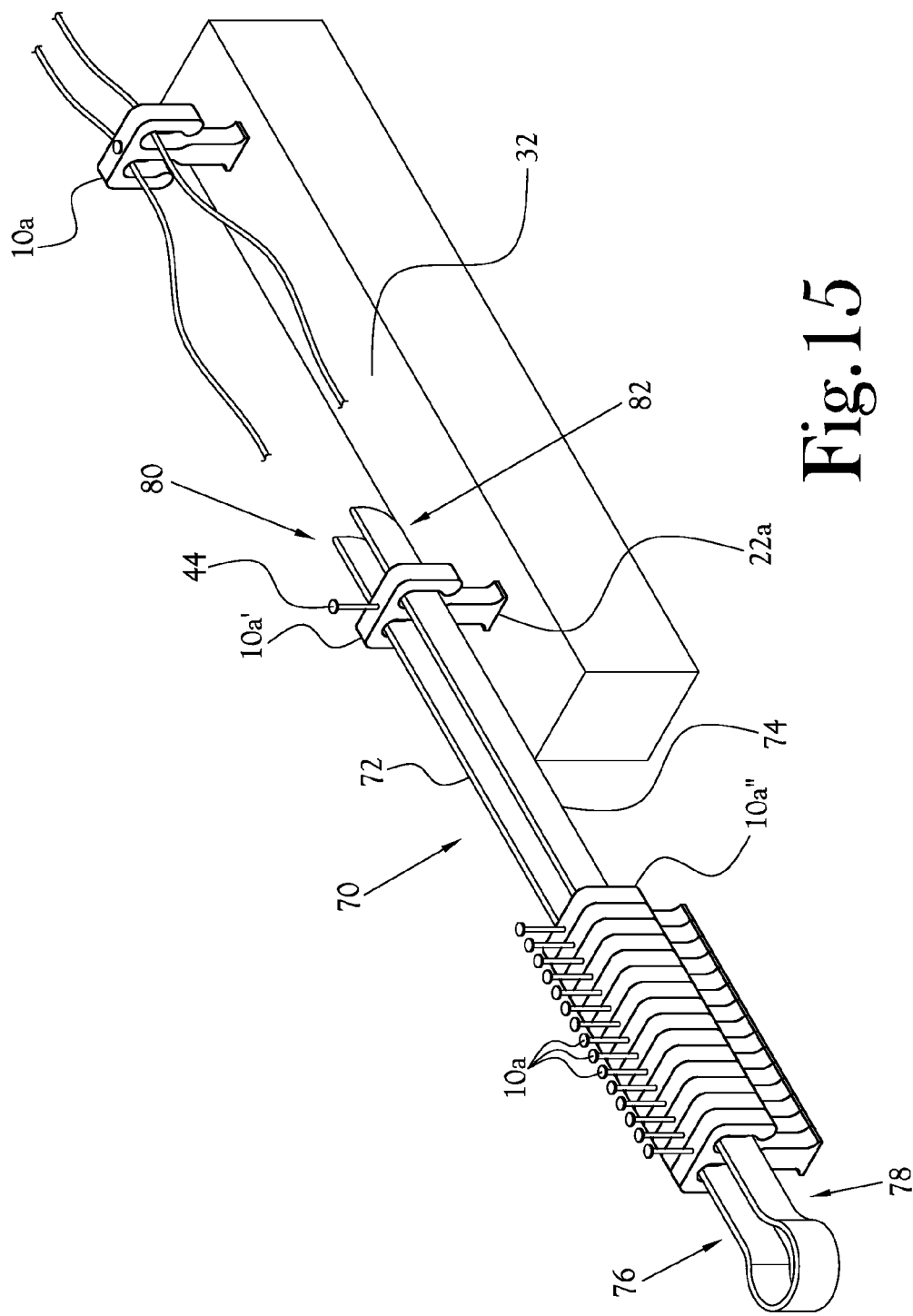
FIG. 15 is a perspective view illustrating one embodiment of a method of installing a cable support pursuant to several features of the present general inventive concept.

In accordance with several features of the present general inventive concept, a method for use of the above-discussed dispenser 70 to install one or more of the above-discussed cable supports 10a along a surface 32 may be understood generally by the illustrations of FIG. 15. As shown in FIG. 15, in one embodiment of the method, a dispenser 70 defining the above-discussed pair of rails 72, 74 may be provided having a plurality of cable supports 10a, received thereon. More particularly, in the illustrated embodiment, a plurality of cable supports 10a are provided in an adjacently stacked, overlying relationship with one another near the proximal ends 76, 78 of the rails 72, 74, with each rail 72 of the dispenser being received within a respective one of the voids 36 of each of the cable supports 10a. In this configuration, a distal-most one of the stack of cable supports 10a' may be repositioned toward the distal ends 80, 82 of the rails 72, 74, thereby spacing the distal-most cable support 10a' apart from the remaining cable supports in the stack along the rails 72, 74. In this configuration, the dispenser 70 may be held proximate a surface 32 to which the distal-most cable support 10a' is to be installed, such that the stop 22a of the distal-most cable support 10a' is positioned adjacent the surface 32 at a desired location for the cable support 10a'. In several embodiments, during the operation of positioning the stop 22a of the distal-most cable support 10a' adjacent the surface 32 at the desired location, the dispenser 70 may be handled near the proximal ends 76, 78 of the rails 72, 74, such that the distal-most cable support may be brought to the desired location along the surface 32 absent the need to directly handle the distal-most cable support 10a'. While the dispenser 70 and associated distal-most cable support 10a' are held in this position, the fastener 44 may be secured to the surface 32 as discussed above, thereby securing the cable support 10a' to the surface 32 with the stop 22a adjacent the surface 32.

Once the cable support 10a' is secured to the surface, the cable support 10a' may be removed from the dispenser 70, for example by sliding the distal ends 80, 82 of the rails 72, 74 of the dispenser 70 through the voids 36 of the cable support 10a', or by pushing the dispenser 70 outward from its respective void 36 of the cable support 10a through the space between the inward protrusion 48 and shoulder 46 at the lower end of each void 36. Thereafter, a subsequent distal-most one of the stack of cable supports 10a" may be repositioned toward the distal ends 80, 82 of the rails 72, 74, and the above-described process may be repeated to install the subsequent cable support at another desired location along the surface 32.

In the illustrated embodiment, the fastener 44 of the cable support 10a is defined by a pin fastener, such as for example a nail, peg, or the like. In this embodiment, the above-described operation of securing the fastener 44 to the surface 32 at the desired location may include driving the pin fastener into the surface 32, using a hammer or other such tool, to establish a frictional connection between the fastener 44 and the surface 32. It will be recognized that, in this embodiment, the above-described dispenser 70 provides the advantage of allowing a user to position a cable support 10a' at a desired location along the surface 32 while maintaining separation of the user's hand from the cable support 10a'. Thus, the above-described dispenser 70 allows for a method of installation of the cable support 10a which serves to reduce the likelihood of injury to the user resulting from those types of accidents involving proximity of the user's hand to the cable support 10a, such as for example inadvertent striking of the user's hand with the driving tool. Additional advantages of the dispenser 70 will be recognized and appreciated by one of skill in the art.

FIG. 16 illustrates another embodiment of a dispenser 70a constructed in accordance with several features of the present general inventive concept. In the embodiment of FIG. 16, each of the proximal ends 76a, 78a of the rails 72a, 74a defines a relatively flattened planar portion 96, with each of the planar portions 96 extending in substantially parallel-planar, spaced apart relationship to one another. In the illustrated embodiment, the planar portions 96 are spaced apart from one another a distance approximately equal to the distance of separation of the respective lower ends of each void 36 of the cable support 10a. Thus, when the cable support 10a is repositioned along the rails 72a, 74a to the planar portions 96, each of the planar portions 96 may be freely removed through the lower ends of each void 36 of the cable support 10a. Thereafter, the dispenser 70a may be separated from the cable support 10a by passing the cable support 10a between the planar portions 96. Thus, in the embodiment of FIG. 16, the dispenser 70a allows for convenient removal of the cable support 10a along either the proximal ends 76a, 78a or the distal ends 80, 82 of the rails 72a, 74a.

From the foregoing description, it will be recognized that a cable support 10 is provided which allows for fastening of one or more cables to a surface, which is quick and convenient to install, and which minimizes the risk of damage to the cable, the risk of electrical shock associated with an uninsulated cable support structure, and the risk of the cable becoming unfastened from the cable support. It will further be recognized that a dispenser 70 and method for use is provided which is capable of allowing quick and convenient installation of one or more cable supports 10 to a desired surface. While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A method for securing a cable along a surface, the method comprising:
   a. providing a dispenser having a plurality of rails extending in parallel, spaced-apart relationship to one another, each rail having a proximal end and a cantilevered distal end;
   b. providing a plurality of cable supports carried by the rails of the dispenser, each cable support having a central shaft portion with a forward end configured to be secured to the surface, a rearward end configured to extend from the surface, and for each rail, a hook structure extending from the central shaft portion rearward end and curving toward the central shaft portion forward end, each hook structure having a corresponding rail slidably received therein such that the plurality of cable supports are arranged in a substantially stacked configuration along the rails;
   c. sliding a distal most one of the cable supports toward the distal ends of the rails, thereby separating the distal most cable support from the remaining cable supports;
   d. positioning the dispenser proximate the surface with the forward end of the distal most cable support proximate a desired mounting location along the surface;
   e. fastening the forward end of the distal most cable support to the surface proximate the desired mounting location, thereby mounting the cable support to the surface;
   f. slidably removing the distal ends of the rails from the mounted cable support; and
   g. inserting the cable into a hook structure of the mounted cable support, thereby securing the cable along the surface.

2. The method of claim 1 wherein the operation of fastening the forward end of the distal most cable support to the surface includes driving a pin fastener extending along the central shaft portion of the cable support into the surface.

3. A dispenser for carrying and dispensing a cable support of the type having a pair of hook structures disposed on opposite sides of a central shaft, the dispenser comprising:
   a plurality of rails extending in parallel, spaced-apart relationship to one another and joined to one another at respective proximal ends thereof, each rail having a cantilevered distal end slidably receivable within one of the hook structures of the cable support, each distal end allowing the cable support to be slidably removed from the rail along the distal end, each rail comprising first and second elongated, adjacent flanges extending along a length of the rail, each flange having a first long edge joined to a first long edge of the adjacent flange and an opposite second long edge separated from the second long edge of the adjacent flange, each rail being resiliently deformable to allow receipt of the rail within a hook structure of a cable support;
   wherein each of the rails is integrally formed with one another.

4. The dispenser of claim 3, each rail distal end defining a taper toward the first long edges of the flanges.

5. The dispenser of claim 4, each rail defining a flattened planar portion extending along a portion of the length of the rail in parallel-planar, overlying, and spaced-apart relationship with the flattened planar portion of the other rail, whereby each cable support is removable from the rails in a direction perpendicular to the length of the rails along the flattened planar portions.

6. A dispenser carrying at least one cable support for securing at least one cable along a surface, each cable support having a central shaft portion with a forward end configured to be secured to the surface, a rearward end configured to extend from the surface, and at least one hook structure extending from the central shaft portion rearward end and curving toward the central shaft portion forward end, the dispenser comprising:
   at least one rail slidably received within the at least one hook structure, the rail having a proximal end and a cantilevered distal end;
   whereby the cantilevered distal end allows the cable support to be slidably removed from the rail along the distal end.

7. The dispenser of claim 6, the at least one rail comprising first and second rails extending parallel to one another, the first rail being slidably received within a first hook structure of each cable support, the second rail being slidably received within a second hook structure of each cable support.

8. The dispenser of claim 7 wherein the first and second rails are joined at respective proximal ends thereof.

9. The dispenser of claim 8 further comprising a loop portion integrally formed with the first and second rail proximal ends.

10. The dispenser of claim 9, each rail being sized and shaped to frictionally engage an associated one of the first and second hook structures.

11. The dispenser of claim 10, each rail having a cross-sectional shape keyed to an interior surface of the associated hook structure.

12. The dispenser of claim 10, each rail being resiliently deformable to allow receipt of the rail within the associated hook structure.

13. The dispenser of claim 12, each rail defining a channel shape.

14. The dispenser of claim 13, each rail comprising first and second elongated, adjacent flanges extending along a length of the rail, each flange having a first long edge joined to a first long edge of the adjacent flange and an opposite second long edge separated from the second long edge of the adjacent flange.

15. The dispenser of claim 14, each rail distal end defining a taper toward the first long edges of the flanges.

16. The dispenser of claim 15, each rail defining a flattened planar portion extending along a portion of the length of the rail in parallel-planar, overlying, and spaced-apart relationship with the flattened planar portion of the other rail, whereby each cable support is removable from the rails in a direction perpendicular to the length of the rails along the flattened planar portions.

* * * * *